United States Patent
Choi et al.

(10) Patent No.: US 10,910,616 B2
(45) Date of Patent: Feb. 2, 2021

(54) BATTERY PACK FOR VEHICLE AND VEHICLE COMPRISING BATTERY PACK

(71) Applicant: LG CHEM, LTD., Seoul (KR)

(72) Inventors: Yong-Joon Choi, Daejeon (KR); Do-Hyeon Kim, Daejeon (KR); Hwa-Joong Kim, Daejeon (KR); Jun-Yeob Seong, Daejeon (KR); Sung-Chun Yu, Daejeon (KR)

(73) Assignee: LG CHEM, LTD., Seoul (KR)

(*) Notice: Subject to any disclaimer, the term of this patent is extended or adjusted under 35 U.S.C. 154(b) by 240 days.

(21) Appl. No.: 16/078,754

(22) PCT Filed: Sep. 20, 2017

(86) PCT No.: PCT/KR2017/010341
§ 371 (c)(1),
(2) Date: Aug. 22, 2018

(87) PCT Pub. No.: WO2018/080022
PCT Pub. Date: May 3, 2018

(65) Prior Publication Data
US 2019/0051875 A1     Feb. 14, 2019

(30) Foreign Application Priority Data

Oct. 24, 2016 (KR) .................. 10-2016-0138552

(51) Int. Cl.
*B60R 16/04*    (2006.01)
*H01M 2/10*     (2006.01)
(Continued)

(52) U.S. Cl.
CPC .......... *H01M 2/1083* (2013.01); *B60L 50/64* (2019.02); *B60L 58/22* (2019.02); *H01M 2/1077* (2013.01);
(Continued)

(58) Field of Classification Search
CPC ............ H01M 2/1083; H01M 2/1077; H01M 10/0481; H01M 10/425; H01M 10/0486;
(Continued)

(56) References Cited

U.S. PATENT DOCUMENTS 7,768,235 B2 * 8/2010 Tae .................. B60L 58/13
320/134
8,043,735 B2 * 10/2011 Nam ................ H01M 10/425
429/7
(Continued)

FOREIGN PATENT DOCUMENTS

JP    2003-7272 A    1/2003
JP    2009-248635 A    10/2009
(Continued)

OTHER PUBLICATIONS

International Search Report for PCT/KR2017/010341 dated Jan. 9, 2018.

*Primary Examiner* — James M Dolak
(74) *Attorney, Agent, or Firm* — Birch, Stewart, Kolasch & Birch, LLP

(57) ABSTRACT

Disclosed is a battery pack for a vehicle, which includes a pack case forming an appearance of the battery pack, a static electricity inducing pattern forming a conductor pattern of a predetermined form on a BMS circuit board provided in the pack case and a discharge terminal connected to the static electricity inducing pattern, and a cable connector for both communicating and grounding, which is composed of a pack connector having a first connection portion configured to be connected to a data transmission terminal on the BMS circuit board and a second connection portion configured to be connected to the discharge terminal, and a vehicle connector connected to the pack connector by a harness cable
(Continued)

and installed to the pack case to be exposed out through a connector mounting hole formed through the pack case.

12 Claims, 8 Drawing Sheets

(51) Int. Cl.
*B60L 58/22* (2019.01)
*H01M 10/04* (2006.01)
*H01M 10/42* (2006.01)
*B60L 50/64* (2019.01)
*H01R 13/648* (2006.01)

(52) U.S. Cl.
CPC ... *H01M 10/0481* (2013.01); *H01M 10/0486* (2013.01); *H01M 10/425* (2013.01); *H01M 2010/4271* (2013.01); *H01M 2010/4278* (2013.01); *H01M 2200/00* (2013.01); *H01M 2220/20* (2013.01); *H01R 13/6485* (2013.01); *Y02T 10/70* (2013.01); *Y02T 90/12* (2013.01); *Y02T 90/16* (2013.01)

(58) Field of Classification Search
CPC . H01M 2010/4271; H01M 2010/4278; H01M 2220/20; H01M 2200/00; B60L 50/64; B60L 50/50; B60L 50/66; B60L 58/22; H01R 13/6485
See application file for complete search history.

(56) References Cited

U.S. PATENT DOCUMENTS

| | | | |
|---|---|---|---|
| 8,076,020 B2* | 12/2011 | Goto | H01M 2/1077 320/112 |
| 8,103,401 B2* | 1/2012 | Kubo | B60L 50/64 701/34.1 |
| 8,440,346 B2 | 5/2013 | Kim | |
| 8,962,174 B2* | 2/2015 | Adachi | H01M 10/425 429/149 |
| 9,006,939 B2* | 4/2015 | Toyama | B60R 16/0215 307/147 |
| 9,073,426 B2* | 7/2015 | Tachikawa | B60K 1/04 |
| 9,093,851 B2* | 7/2015 | Park | B60L 3/0046 |
| 9,260,065 B2* | 2/2016 | Tanigaki | B60K 1/04 |
| 9,531,091 B2* | 12/2016 | Loo | B60K 1/04 |
| 9,647,471 B2* | 5/2017 | Waterford | H02J 7/0042 |
| 10,020,547 B2* | 7/2018 | Eom | H01M 10/482 |
| 10,661,737 B2* | 5/2020 | Shiraishi | H02J 7/0063 |
| 10,693,199 B2* | 6/2020 | Bang | H01M 10/663 |
| 10,734,628 B2* | 8/2020 | Takahashi | H01M 2/20 |
| 10,734,687 B2* | 8/2020 | Baek | H01M 2/1077 |
| 10,749,224 B2* | 8/2020 | Podolefsky | H01M 2/1077 |
| 10,766,347 B2* | 9/2020 | Iwasa | B60K 1/04 |
| 10,784,545 B2* | 9/2020 | Tucker | H01M 2/206 |
| 2014/0072835 A1* | 3/2014 | Tsujimura | H01M 10/613 429/7 |
| 2016/0164053 A1 | 6/2016 | Lee et al. | |

FOREIGN PATENT DOCUMENTS

| | | |
|---|---|---|
| JP | 2010-287318 A | 12/2010 |
| JP | 2013-148753 A | 8/2013 |
| JP | 2013-161543 A | 8/2013 |
| KR | 10-2008-0084237 A | 9/2008 |
| KR | 10-2015-0022389 A | 3/2015 |
| KR | 10-2016-0021499 A | 2/2016 |
| KR | 10-2016-0049895 A | 5/2016 |
| KR | 10-2016-0080359 A | 7/2016 |

* cited by examiner

BATTERY PACK FOR VEHICLE AND VEHICLE COMPRISING BATTERY PACK

TECHNICAL FIELD

The present disclosure relates to a battery pack, and more particularly, to a battery pack capable of preventing damage to electric components such as a BMS circuit built in the battery pack when an electrostatic discharge (ESD) occurs inside or outside the battery pack.

The present application claims priority to Korean Patent Application No. 10-2016-0138552 filed on Oct. 24, 2016 in the Republic of Korea, the disclosures of which are incorporated herein by reference.

BACKGROUND ART

In recent years, secondary batteries have been widely used not only for small-sized devices such as portable electronic devices but also for electric vehicles that require a driving force by using an internal combustion engine and/or an electric motor. The electric vehicle includes a hybrid vehicle, a plug-in hybrid vehicle, and a pure electric vehicle driven only by an electric motor and a battery without an internal combustion engine.

In an electric vehicle, a large number of secondary batteries are electrically connected to increase capacity and output. Particularly, pouch-type secondary batteries are commonly used in such medium or large devices since they are easily stackable on one another.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. The number of battery cells included in the battery pack may be variously set according to the required output voltage or the demanded charge/discharge capacity.

Meanwhile, while the battery pack is outputting or recharging power required of a vehicle, static electricity may be generated internally. In addition, static electricity generated outside the battery pack may enter the battery pack depending on external environment factors. For example, if an electrostatic discharge (ESD) phenomenon occurs outside the battery pack due to any factor, static electricity can be introduced into the battery pack through an air venting port of a battery pack case. In addition, static electricity generated at the outside may be introduced into the battery pack through positive and negative electrode terminals exposed to the outside of the pack case, or by means of a metallic fastening member such as a bolt which is frequently used for assembling the pack case.

If the static electricity generated inside the battery pack or introduced from the outside is accumulated in the battery pack, an electronic device affected by the static electricity is highly likely to malfunction without any apparent reason. In particular, if the BMS circuit responsible for charging/discharging and overall control of the battery pack is damaged or fails, the stability of the battery pack may be seriously damaged.

DISCLOSURE

Technical Problem

The present disclosure is designed to solve the problems of the related art, and therefore the present disclosure is directed to a battery pack, which may prevent static electricity from being accumulated in the battery pack when an electrostatic discharge (ESD) occurs inside or outside the battery pack, so that electronic devices such as a BMS circuit are not damaged.

However, the technical objects aimed by the present disclosure are not limited to the above, and other objects not mentioned herein will be apparently understood from the following description by those skilled in the art.

Technical Solution

In one aspect of the present disclosure, there is provided a battery pack for a vehicle, comprising: a pack case forming an appearance of the battery pack; a static electricity inducing pattern forming a conductor pattern of a predetermined form on a BMS circuit board provided in the pack case and a discharge terminal connected to the static electricity inducing pattern; and a cable connector for both communicating and grounding, which is composed of a pack connector having a first connection portion configured to be connected to a data transmission terminal on the BMS circuit board and a second connection portion configured to be connected to the discharge terminal, and a vehicle connector connected to the pack connector by a harness cable and installed to the pack case to be exposed out through a connector mounting hole formed through the pack case.

The pack connector may include a first pack connector and a second pack connector independently provided to be separated from the first pack connector, and the first connection portion may be defined by the first pack connector, and the second connection portion may be defined by the second pack connector.

The pack case may further include a cell assembly having a plurality of secondary batteries and end plates located at top and bottom portions of the cell assembly to support the cell assembly; and a ground wire configured to electrically connect the BMS circuit board and the end plates.

A wire mounting unit may be provided at the BMS circuit board so that one end of the ground wire is fixed thereto, and the wire mounting unit may be located on the static electricity inducing pattern.

The wire mounting unit may be provided to a corner region of the BMS circuit board, and the static electricity inducing pattern may be formed along an edge region of the BMS circuit board.

A static electricity discharge filter configured as a passive element may be provided at the BMS circuit board, and the static electricity inducing pattern may include a first inducing pattern connected to the pack connector on the basis of the wire mounting unit and a second inducing pattern connected to the static electricity discharge filter.

The end plates may include a lower plate disposed at the bottom portion of the cell assembly and an upper plate disposed above the lower plate with the cell assembly being interposed therebetween, and a long bolt member connected to the upper plate, the cell assembly and the lower plate to assemble the upper plate, the cell assembly and the lower plate into a single body may be further provided.

The BMS circuit board may be mounted to an insulating frame and located at an upper surface of the upper plate.

The pack case may include a lower case configured to form an inner space capable of accommodating the end plates and the cell assembly and an upper case configured to cover a top portion of the lower case, and the connector mounting hole may be provided at the upper case.

The long bolt member may pass through a bolt-coupling hole vertically formed in the upper case and assemble the upper case, the upper plate, the cell assembly and the lower plate into a single body.

The data transmission terminal and the discharge terminal may be selected from a plurality of pins regularly arranged on the BMS circuit board at regular intervals, and the pack connector may be provided in a single number, and the first connection portion and the second connection portion may be provided as conductors which individually come into contact with the pins.

In another aspect of the present disclosure, there is also provided a vehicle including the battery pack described above. The vehicle may comprise a ground line configured to electrically connect the vehicle connector of the battery pack to a vehicle body.

Advantageous Effects

In an embodiment of the present disclosure, it is possible to provide a battery pack, which may prevent static electricity from being accumulated in the battery pack when an electrostatic discharge (ESD) occurs inside or outside the battery pack, so that electronic devices such as a BMS circuit are not damaged.

Furthermore, in another embodiment of the present disclosure, it is possible to achieve efficiency and economic feasibility by using an existing communication cable connector of a vehicle, which is wired from the inside of the battery pack to the outside thereof, for both communicating and grounding.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
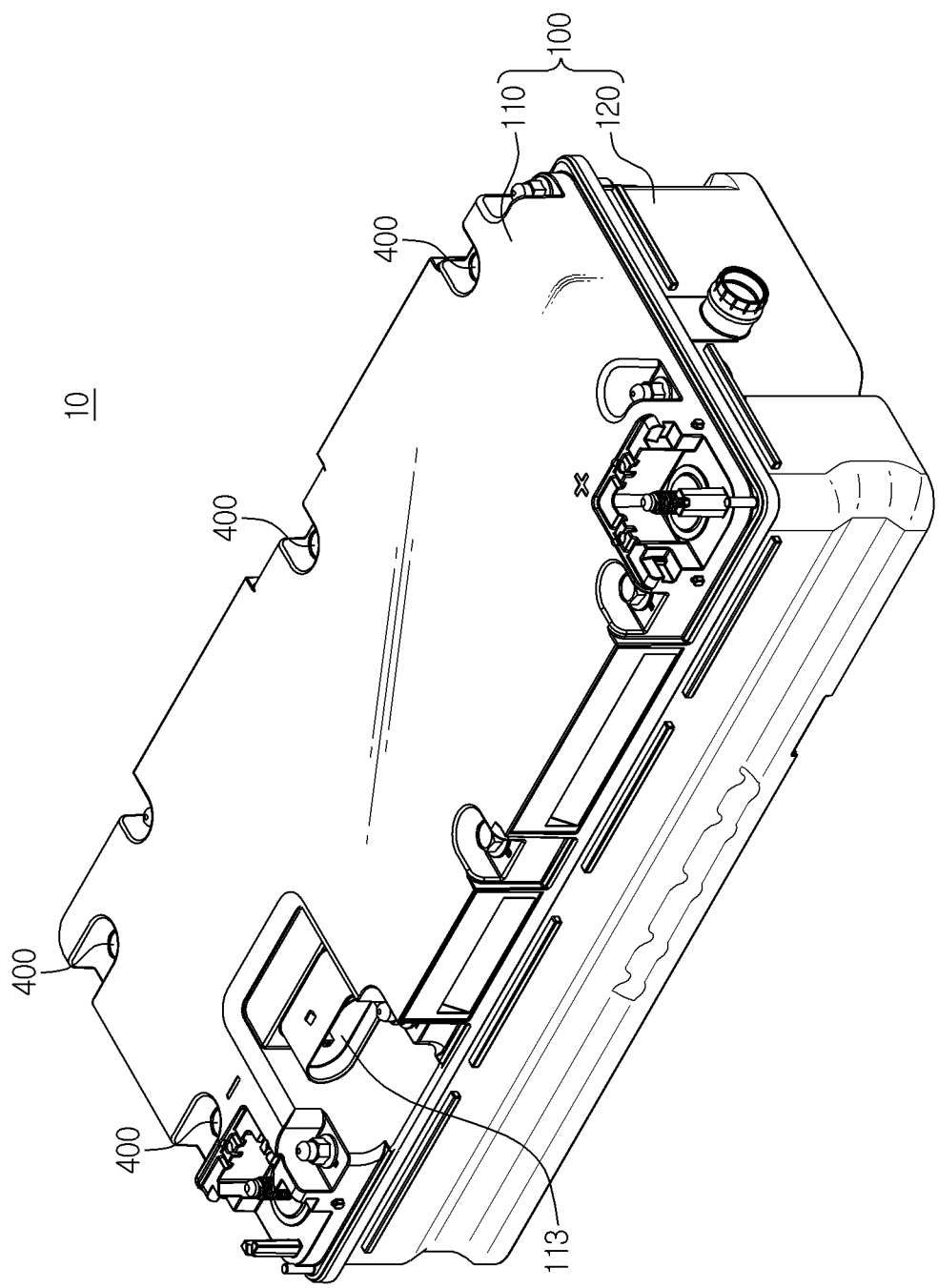
FIG. 1 is a perspective view showing a battery pack according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

A battery pack of the present disclosure as described below may be provided to a vehicle as an energy source of the vehicle. For example, the battery pack may be provided to an electric vehicle, a hybrid vehicle, a plug-in hybrid vehicle, and the like. In addition to the vehicle, the battery pack may also be provided to other devices, instruments, facilities or the like such as an energy storage system.

Figure 2:
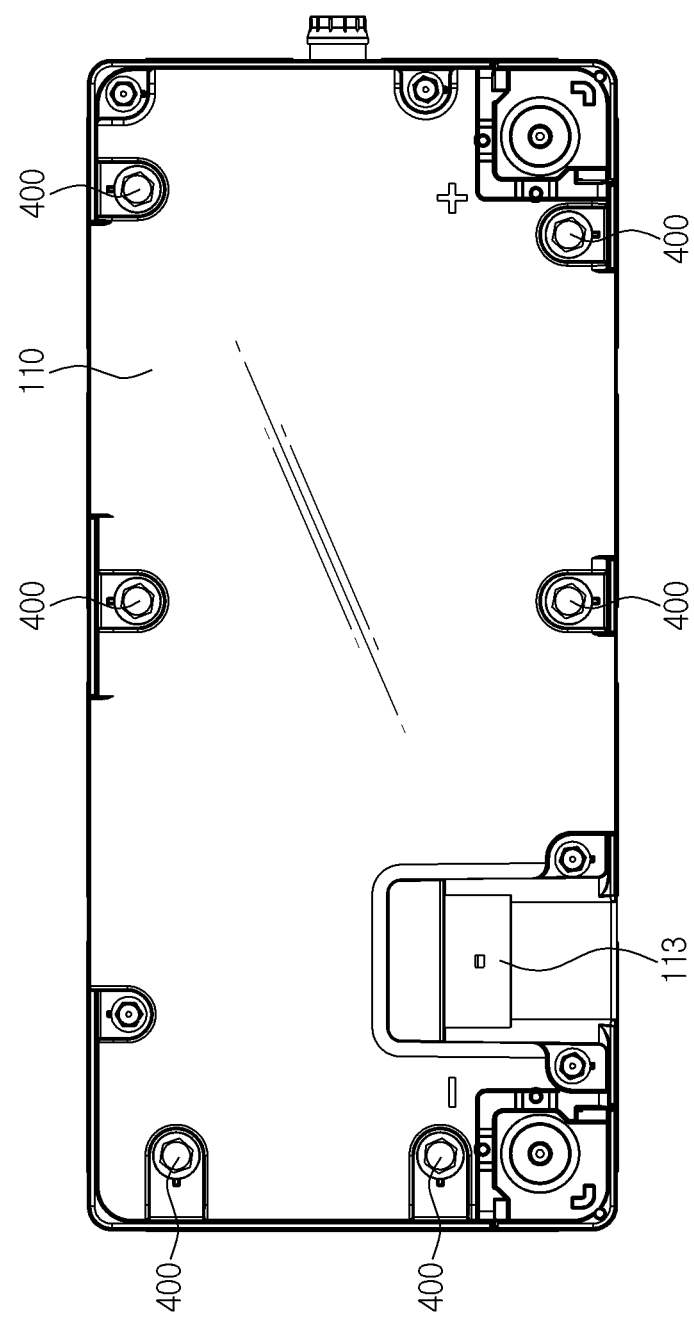
FIG. 2 is a top view of FIG. 1.
Figure 3:
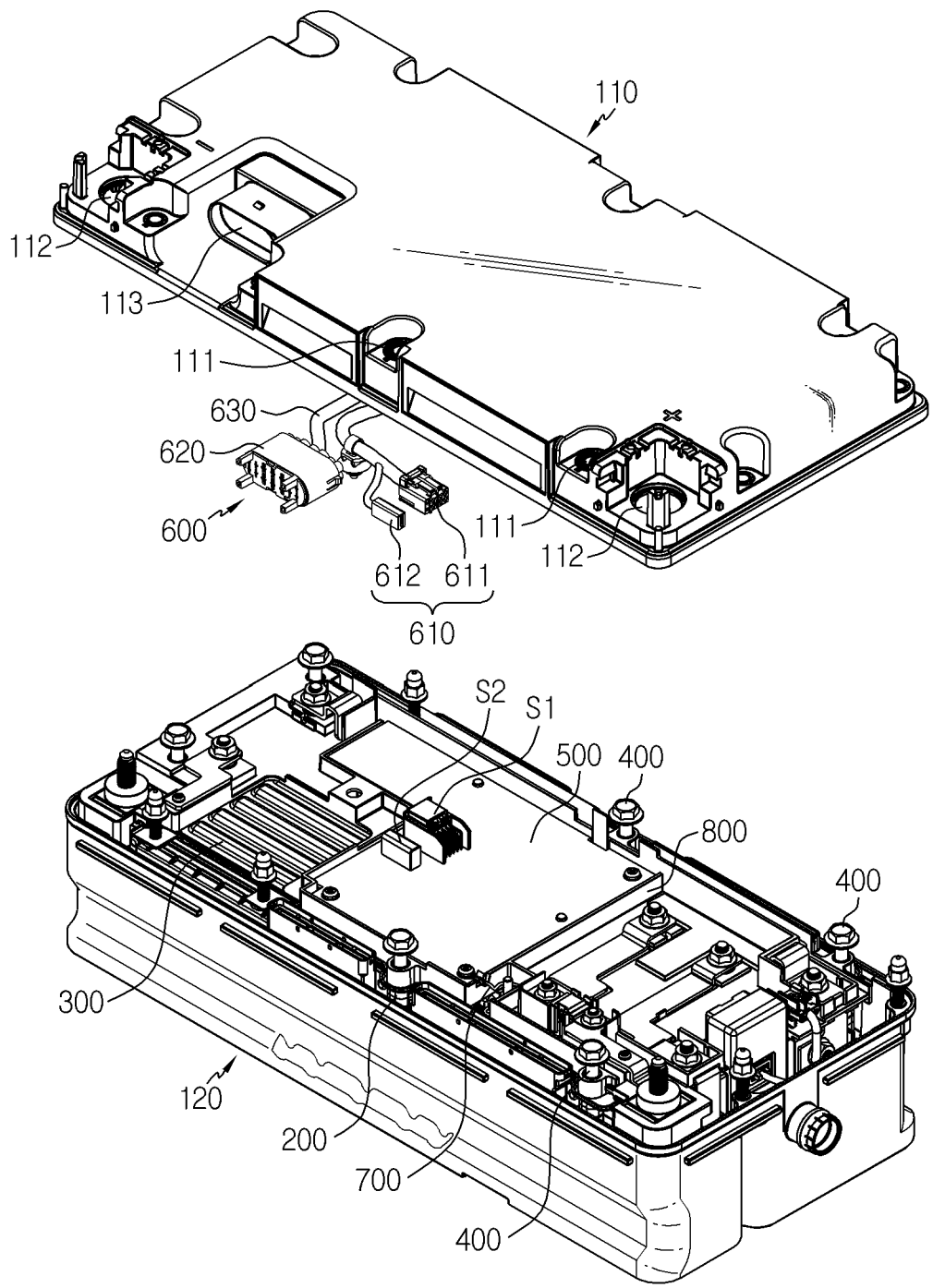
FIG. 3 is a perspective view showing the battery pack of FIG. 1, from which an upper case and a cable connector for both communicating and grounding are separated.
Figure 4:
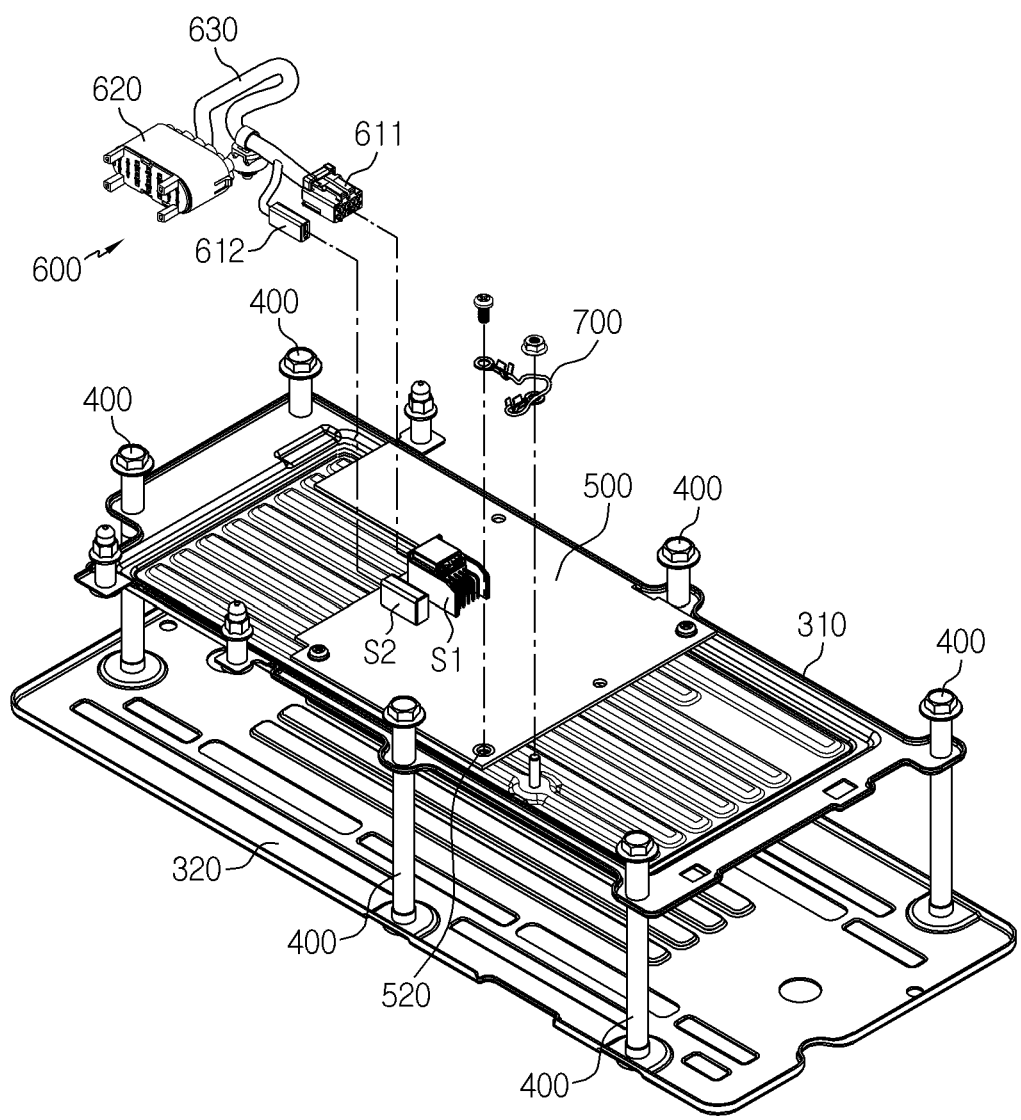
FIGS. 4 and 5 are perspective views before and after main components according to an embodiment of the present disclosure are combined.
Figure 5:
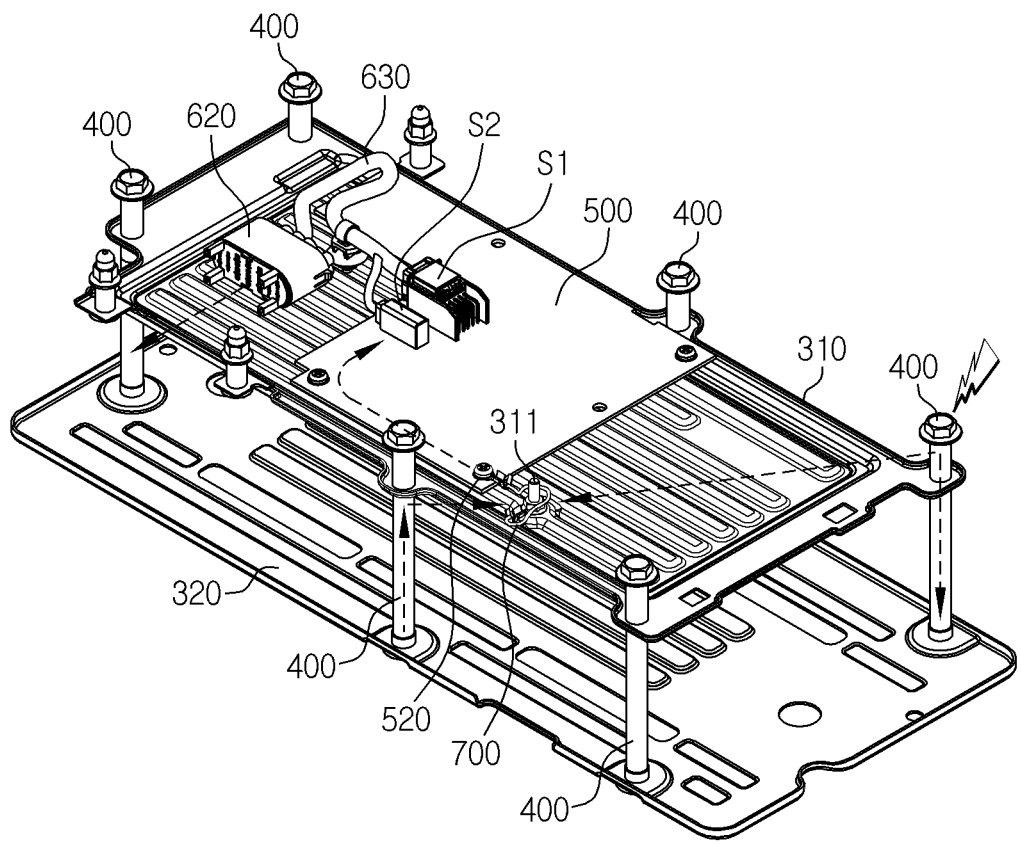

FIG. 1 is a perspective view showing a battery pack according to an embodiment of the present disclosure, FIG. 2 is a top view of FIG. 1, FIG. 3 is a perspective view showing the battery pack of FIG. 1, from which an upper case and a cable connector for both communicating and grounding are separated, and FIGS. 4 and 5 are perspective views before and after main components according to an embodiment of the present disclosure are combined.

Referring to FIGS. 1 to 5, a battery pack 10 according to an embodiment of the present disclosure includes a pack case 100, a cell assembly 200 accommodated in the pack case 100, end plates 300 located at top and bottom portions of the cell assembly 200, a long bolt member 400 for assembling the above components into a single body, a BMS circuit board 500 located at a top surface of the end plate 300, a cable connector 600 for both communicating and grounding connected to the BMS circuit board 500, and a ground wire 700.

The pack case 100 forms an appearance of the battery pack 10 and may be mounted to an electric vehicle 20. The pack case 100 may be composed of an upper case 110 and a lower case 120. The lower case 120 is configured to have an inner space in which the cell assembly 200, the end plates 300 and other electric components assembled into a single body may be accommodated, and the upper case 110 is configured to cover a top portion of the lower case 120.

An electrode terminal coupling hole 122 and a long bolt-coupling hole 111 may be formed in the upper case 110. Positive and negative electrode terminals of the battery pack 10 may pass through the electrode terminal coupling hole 122 and be exposed above the pack case 100. In addition, the positive and negative electrode terminals of the battery pack 10 may be connected to a power cable which leads to a drive motor of a vehicle. As explained later, a long bolt member 400 for assembling the upper case 110, the end plates 300 and the cell assembly 200 into a single body may be inserted into the long bolt-coupling hole 111 in a downward direction. A head portion of the long bolt member 400 may be formed to have a larger diameter than the long bolt-coupling hole 111 so as to press the upper case 110 and be exposed out of the upper case 110.

As shown in FIGS. 1 to 5, a connector mounting hole 113 may be further formed in the upper case 110. One end of the cable connector 600 for both communicating and grounding is mounted in the connector mounting hole 113, and the cable connector 600 for both communicating and grounding may be connected to a communication line 24 and a ground line 22 out of the battery pack 10.

Battery information may be transmitted to devices in or out of the vehicle through the communication line 24, and a driver may visually check the battery information such as temperature, state of charge or discharge through a display device. In addition, the cable connector 600 for both communicating and grounding may be used for grounding static electricity inside the battery pack 10, which will be described in detail later.

The cell assembly 200 may include a plurality of secondary batteries and a cartridge for stacking the plurality of secondary batteries, although not shown in detail for convenience of illustration.

Briefly describing the cell assembly 200, the cell assembly 200 may be substantially an aggregation of a plurality of secondary batteries. The secondary batteries may be pouch-type secondary batteries which have high energy density and be easy stacked. Since the pouch-type secondary batteries lack mechanical rigidity, a cartridge may be used to hold the secondary batteries and prevent them from moving. The cartridge may include a stacking frame of a rectangular ring shape and a cooling plate mounted thereto. For example, at least one secondary battery cell is placed on an upper surface of any one cartridge, then another cartridge is placed thereon, and then the upper and lower cartridges are assembled there to in a snap-fit manner. The cell assembly 200 may be configured by stacking secondary batteries and cartridges in a vertical direction as described above.

Referring to FIGS. 4 and 5 along with FIG. 3, the end plates 300 may be provided approximately in a plate form with a large area and may cover the top and bottom portions of the cell assembly 200. In more detail, the end plates 300 may include a lower plate 320 disposed at the bottom portion of the cell assembly 200 and an upper plate 310 disposed above the lower plate 320 with the cell assembly 200 being interposed therebetween.

The end plate 300 may protect the cell assembly 200 from an external impact or the like. Thus, the end plate 300 may be made of a metal material such as steel to ensure rigidity.

The upper plate 310, the cell assembly 200 and the lower plate 320 may be assembled into a single body by the long bolt member 400. For example, the upper plate 310 has a hole through which the long bolt member 400 may be inserted, and the lower plate 320 has a groove below the hole so that a thread of the long bolt member 400 may be coupled thereto. For reference, FIGS. 4 and 5 depict only the upper and lower end plates 300, except for the cell assembly 200. However, the cell assembly 200 may be positioned between the upper plate 310 and the lower plate 320. The cell assembly 200 also has a hole into which the long bolt member 400 is inserted in a vertical direction. Thus, the long bolt member 400 may pass through the holes of the upper plate 310 and the cell assembly 200 and be coupled to the groove on the upper plate 310. By doing so, the upper plate 310, the cell assembly 200 and the lower plate 320 are integrally assembled to ensure firm coupling among them.

The components assembled into a single body by the long bolt member 400 may be limited to the upper plate 310, the cell assembly 200 and the lower plate 320 as described above, or the upper case 110 may be added to the single body as in this embodiment. For example, the upper case 110 has the long bolt-coupling hole 111 at a location corresponding to a vertical upper portion of the hole of the upper plate 310, as described above. The long bolt member 400 passes through the long bolt-coupling hole 111 in a vertical direction and is connected to the upper case 110, the upper plate 310, the cell assembly 200 and the lower plate 320 to assemble them into a single body. At this time, the top surface of the upper case 110 may be pressed downward by the head portion of the long bolt member 400.

Since the upper case 110 is assembled with the upper plate 310, the cell assembly 200 and the lower plate 320 into a single body as described above, it is possible to enhance the coupling force and airtightness of the upper case 110 to the lower case 120.

Referring to FIGS. 3 to 5 again, the BMS circuit board 500 of this embodiment may be located at the top of the upper plate 310. In addition to the BMS circuit board 500, other electric components such as a relay assembly and a plurality of bus bars may be located on the upper plate 310. Other electric components including the BMS circuit board 500 (see FIG. 3) may be mounted on an insulation board 800 made of an insulating material.

The insulation board 800 serves as an insulator between the electric components including the BMS circuit board 500 and the upper plate 310 made of metal and provides a place where the BMS circuit board 500 and the electric components may be assembled. The insulation board 800 may also have a hole into which the long bolt member 400 may be inserted so as to be integrally assembled with the upper case 110, the upper plate 310, the cell assembly 200 and the lower plate 320, similarly to the above.

Meanwhile, the battery management system (BMS) refers to a battery management device that controls overall charging and discharging operations of the secondary batteries and may be regarded as a component that is typically included in the battery pack 10. The BMS may be implemented as a printed circuit board on which a control circuit is printed, and various elements such as a memory, a capacitor, a resistor and a diode may be intensively mounted on the BMS circuit board 500.

Figure 6:
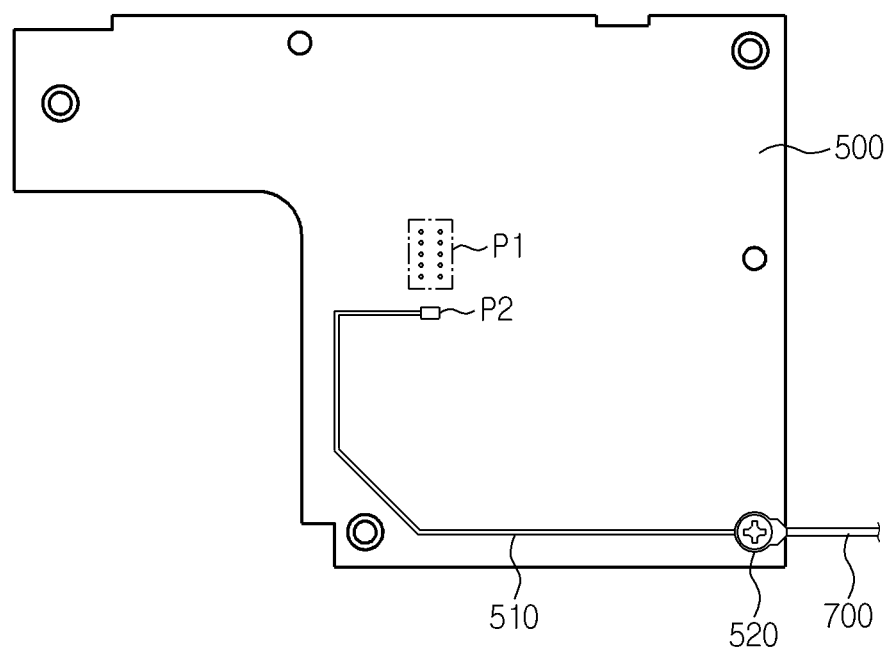
FIG. 6 is a rear view schematically showing only a main configuration of the BMS circuit board of FIG. 5.

Particularly, on the BMS circuit board 500 according to an embodiment of the present disclosure, as shown in FIG. 6, a data transmission terminal P1 for transmitting battery information to an external device and a discharge terminal P2 connected to a static electricity inducing pattern 510 forming a conductor pattern of a predetermined type may be further provided.

When static electricity is generated to supply a current to the BMS circuit board 500, the static electricity inducing pattern 510 induces the current to the cable connector 600 for both communicating and grounding sides. The static electricity inducing pattern 510 may be formed along an edge of the BMS circuit board 500 to bypass the BMS circuit and other elements in order to minimize electrical interference with the BMS circuitry and other components. The discharge terminal P2 may be located at one end of the static electricity inducing pattern 510.

The discharge terminal P2 may be formed at a position spaced apart from the data transmission terminal P1 by a predetermined distance, which may minimize mutual noise by giving the distance between the discharge terminal P2 and the data transmission terminal P1. The discharge terminal P2 and the data transmission terminal P1 may be electrically connected to the cable connector 600 for both communicating and grounding.

Referring to FIGS. 4 and 5 again, the cable connector 600 for both communicating and grounding may include a pack connector 610, a vehicle connector 620, and a harness cable 630 for connecting them.

First, the vehicle connector 620 may be fixedly mounted to the connector mounting hole 113 provided in the upper case 110 in a snap-fit manner. The vehicle connector 620 may be connected to a separate harness cable 630 connector outside the battery pack 10. Here, a portion of the cable may be wired along the communication line and another portion of the cable may be grounded to a vehicle body 26 along the ground line 22.

The harness cable 630 electrically connects the vehicle connector 620 and the pack connector 610 by using a bundle of wires which are classified according to usages such as data transmission and grounding. The bundle of wires may be protected in a single thick sheath. Meanwhile, in this embodiment, the harness cable 630 is divided into two halves, one connected to the first pack connector 611 and the other connected to the second pack connector 612.

The pack connector 610 includes a first connection portion 611 and a second connection portion 612. Here, the first connection portion 611 may be a component that is connected to the data transmission terminal P1, and the second connection portion 612 may be a component that is connected to the discharge terminal P2.

In detail, as shown in FIGS. 4 and 5, the pack connector 610 may be implemented with two connectors, namely a first pack connector 611 and a second pack connector 612. Here, the first connection portion 611 may be defined as a first pack connector 611, and the first pack connector 611 may be inserted into a data transmission socket S1 and connected to the data transmission terminal P1. Also, the second connection portion 612 may be defined as a second pack connector 612, and the second pack connector 612 may be plugged into a discharge terminal socket S2 and connected to the discharge terminal P2.

As described above, the pack connector 610 of this embodiment may be divided into two connectors having separate uses and may be individually connected to the data transmission terminal P1 and the discharge terminal P2. In other words, the first connection portion 611 and the second connection portion 612 of this embodiment are connected to the data transmission terminal P1 and the discharge terminal P2, respectively, in a structurally separated state, which may minimize the electrical noise or impact between them.

In addition, if the cable connector 600 for both communicating and grounding and the discharging terminal P2 are used, when static electricity is generated in the battery pack 10 to supply current to the BMS circuit board 500, the current may flow out of the battery pack 10 after passing through the static electricity inducing pattern 510, the discharge terminal P2, the second pack connector 612, the harness cable 630 and the vehicle connector 620 in order. Also, the current may be grounded to the vehicle body 26 of the vehicle along the ground line 22 outside the battery pack 10.

Moreover, the battery pack 10 according to the present disclosure may further include a ground wire 700 for electrically connecting the BMS circuit board 500 and the end plate 300.

Figure 7:
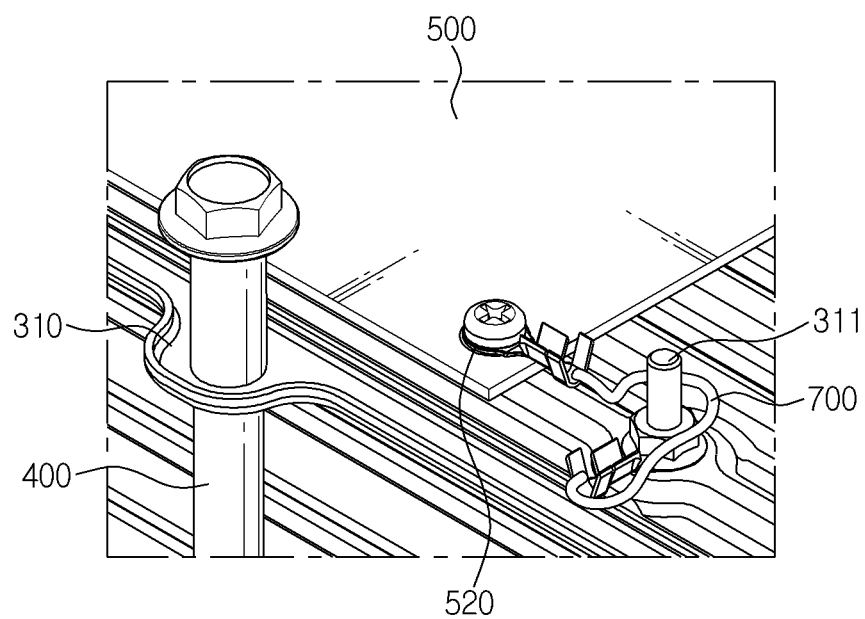
FIG. 7 is a partially enlarged view of FIG. 5.
Figure 8:
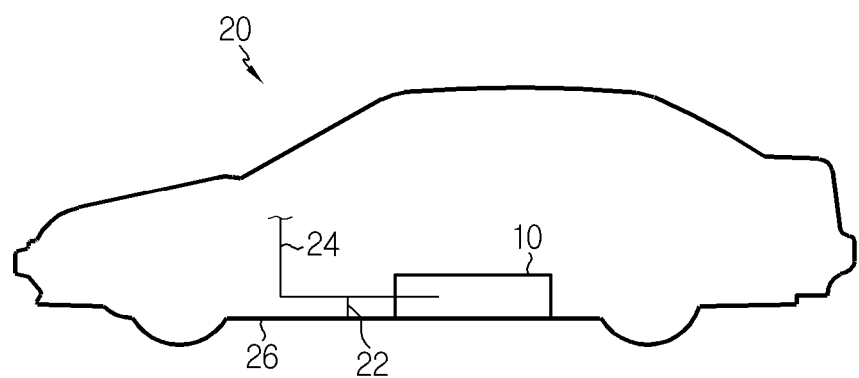
FIG. 8 is a schematic view showing a grounding configuration of a vehicle and a battery pack according to an embodiment of the present disclosure.

As shown in FIGS. 5 and 7, one end of the ground wire 700 may be fixed to a wire mounting unit 520 of the BMS circuit board 500, and the other end thereof may be fixed to a wire-coupling protrusion of the end plate 300. In this embodiment, the ground wire 700 is fixed using screws and nuts, but other similar fastening means may also be used.

In this embodiment, a single ground wire 700 is used to connect the BMS circuit board 500 and the end plate 300, and accordingly a single wire mounting unit 520 is provided and positioned on the static electricity inducing pattern 510. However, unlike this embodiment, it is possible that two or more ground wires 700 are installed, and accordingly two or more wire mounting units 520 may also be provided.

As described above, the end plate 300 includes upper and lower plates 310, 320 made of metal, and the upper and lower plates 310, 320 are connected into a single body by the long bolt member 400. The end plate 300 may serve as a ground in the battery pack 10. In other words, since the end plate 300 forms a relatively large resistor than the BMS circuit, the end plate 300 may serve as a ground when the static electricity is generated at the inside of the battery pack 10.

As the end plate 300 gives a grounding function, it is possible to protect electronic devices such as the BMS circuit board 500. However, even in this case, charges may be accumulated at the end plate 300, and thus a risk caused by the electrostatic discharge (ESD) is still remaining. In addition, depending on the surrounding environment factors, charges may be introduced into the battery pack 10 due to the electrostatic discharge phenomenon outside the battery pack 10.

In the battery pack 10 according to an embodiment of the present disclosure, the wire mounting unit 520 is located on the static electricity inducing pattern 510. Thus, even when static electricity is introduced to the outside of the battery pack 10, it is possible to allow the static electricity to flow out of the battery pack 10 through cable connector 600 for both communicating and grounding.

For example, if static electricity is generated outside the battery pack 10 due to any factor, as shown in FIG. 5, current can flow into the battery pack 10 through the head portion of the long bolt member 400. In this embodiment, the upper plate 310 and the lower plate 320 made of metal are connected by the long bolt member 400. Thus, as indicated by a flow line in FIG. 5, the current may flow through the long bolt member 400, the upper or lower plate 310, 320, the wire connecting protrusion 311 of the upper plate 310, the ground wire 700, the static electricity inducing pattern 510, the discharge terminal P2, the second pack connector 610, the harness wire and the vehicle connector 620 in order and emits out of the battery pack 10. At the outside of the battery pack 10, the ground line 22 may be configured separately from the data communication line 24 so that current may flow to the vehicle body 26 of the vehicle 20.

The battery pack 10 of the present disclosure may have improved reliability with respect to electrostatic discharge (ESD) of the BMS circuit and other electronic devices because static electricity is not accumulated inside the battery pack 10.

Figure 9:
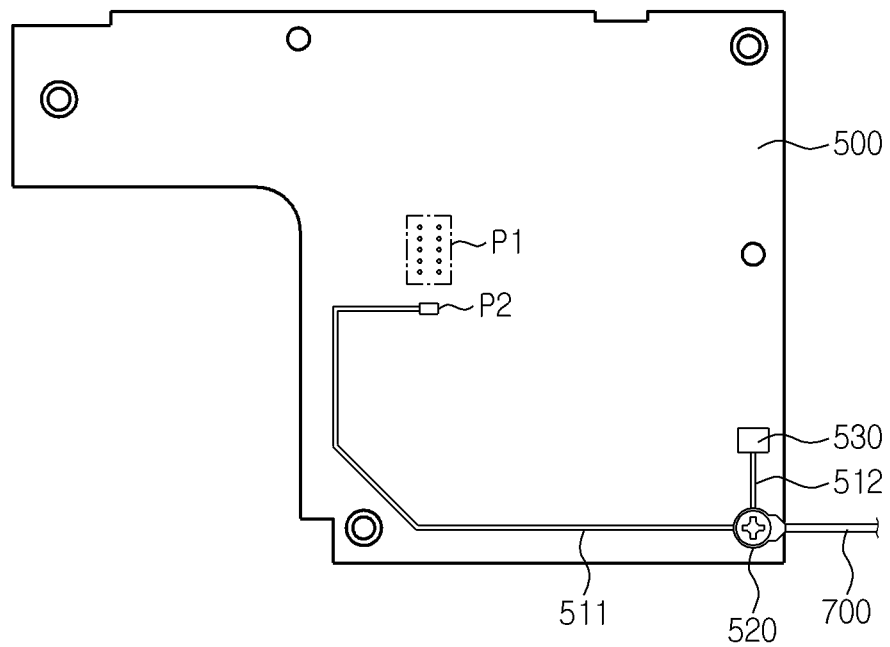
FIG. 9 is a rear view showing only a main configuration of a BMS circuit board according to another embodiment of the present disclosure.

FIG. 9 is a rear view showing only a main configuration of a BMS circuit board according to another embodiment of the present disclosure.

In FIG. 9, the same elements as in FIG. 6 are denoted by the same reference signs and will not be described in detail here.

Referring to FIG. 9, a static electricity discharge filter 530 is further provided on the BMS circuit board 500 according to another embodiment of the present disclosure. The static electricity discharge filter 530 may be configured to consume electric energy without affecting other elements on the BMS circuit board 500 in order to discharge static electricity and may be an optional combination of passive elements such as diodes, resistors, capacitors and the like.

In this embodiment, the static electricity inducing pattern 510 includes a first inducing pattern 511 connected to the pack connector 610 and a second inducing pattern 512 connected to the static electricity discharge filter 530, based on the wire mounting unit 520. Thus, the current supplied to the BMS circuit board 500 from outside may flow in both directions along the first inducing pattern 511 and the second inducing pattern 512. In this case, the static electricity discharge filter 530 may perform electrostatic discharge and the cable connector 600 for both communicating and grounding may emit static electricity to the outside and ground the vehicle body of the vehicle, simultaneously.

In another embodiment of the present disclosure, the static electricity discharge filter 530 is further provided as a circuit protecting means, and thus the reliability of the electrostatic discharge (ESD) of the BMS circuit may be improved further.

Figure 10:
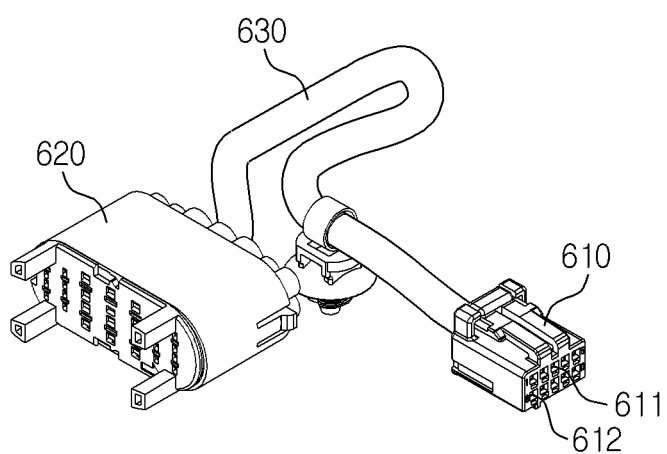
FIG. 10 is a perspective view showing a cable connector for both communicating and grounding according to still another embodiment of the present disclosure.
Figure 11:
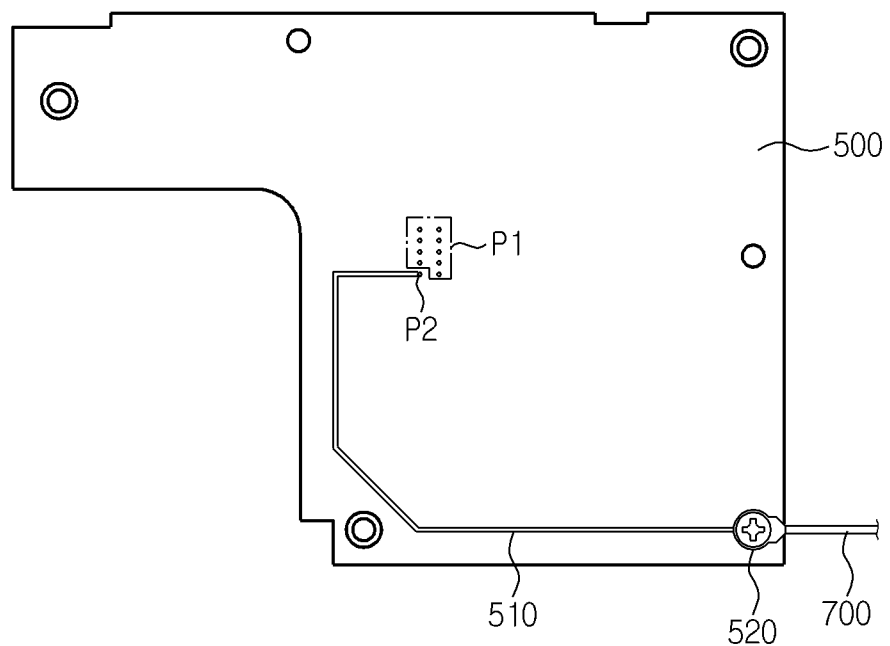
FIG. 11 is a rear view schematically showing only a main configuration of a BMS circuit board according to still another embodiment of the present disclosure.

FIG. 10 is a perspective view showing a cable connector for both communicating and grounding according to still another embodiment of the present disclosure, and FIG. 11 is a rear view schematically showing only a main configuration of a BMS circuit board according to still another embodiment of the present disclosure.

Referring to FIGS. 10 and 11, according to still another embodiment of the present disclosure, the data transmission terminal P1 and the discharge terminal P2 may be selected from a plurality of pins uniformly arranged at regular intervals on the BMS circuit board 500. In addition, the pack connector 610 may be provided as a single, and in this case, the first connection portion 611 and the second connection portion 612 may be provided as conductors which are in contact with the pins individually.

In other words, the first connection portion 611 may be conductors which are a series of pins corresponding to the data transmission terminal P1, and the second connection portion 612 may be conductors which are pins corresponding to the discharge terminal P2.

In this embodiment, by inserting a single pack connector 610 into one socket provided on the BMS circuit board 500 in a plug-in manner, the first connection portion 611 and the second connection portion 612 may be connected to the data transmission terminal P1 and the discharge terminal P2, respectively.

In the present disclosure, the first connection portion 611 and the second connection portion 612 are conceptually distinguishable elements and may be implemented as individual conductors in a single pack connector 610, without being implemented as individual connectors as in the former embodiment. In this case, the data transmission terminal P1 and the discharge terminal P2 may be selected from a plurality of serial pins, respectively, corresponding to the individual conductors.

In this embodiment of the present disclosure, the BMS circuit board 500 may have a higher degree of spatial freedom than the former embodiments, and the terminals may be connected to the connector more easily since only one connector is used to connect the data transmission terminal P1 and the discharge terminal P2.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

What is claimed is:

1. A battery pack for a vehicle, comprising:
    a pack case forming an exterior surface, the pack case having a connector mounting hole;
    a Battery Management System (BMS) circuit board provided in the pack case;
    a static electricity inducing pattern forming a conductor pattern of a predetermined form on the BMS circuit board;
    a discharge terminal on the BMS circuit board and connected to the static electricity inducing pattern; and
    a cable connector for both communicating and grounding, comprising:
        a harness cable extending through the connector mounting hole;
        a pack connector at a first end of the harness cable, the pack connector having a first connection portion connected to a data transmission terminal on the BMS circuit board and a second connection portion connected to the discharge terminal; and
        a vehicle connector at a second end of the harness cable, the vehicle connector being outside the pack case.

2. The battery pack for a vehicle according to claim 1, wherein the pack connector includes a first pack connector and a second pack connector independently separated from the first pack connector, and
    wherein the first connection portion is the first pack connector, and the second connection portion is the second pack connector.

3. A battery pack for a vehicle, comprising:
    a pack case forming an exterior surface, the pack case having a connector mounting hole;
    a Battery Management System (BMS) circuit board provided in the pack case;
    a static electricity inducing pattern forming a conductor pattern of a predetermined form on the BMS circuit board;
    a discharge terminal on the BMS circuit board and connected to the static electricity inducing pattern;
    a cable connector for both communicating and grounding, comprising:
        a pack connector having a first connection portion connected to a data transmission terminal on the BMS circuit board and a second connection portion connected to the discharge terminal; and
        a vehicle connector connected to the pack connector by a harness cable extending through a connector mounting hole formed through the pack case;
    a cell assembly having a plurality of secondary batteries and end plates located at top and bottom portions of the cell assembly to support the cell assembly; and a ground wire electrically connecting the BMS circuit board and the end plates.

4. The battery pack for a vehicle according to claim 3, wherein a wire mounting unit is provided at the BMS circuit board so that one end of the ground wire is fixed thereto, and the wire mounting unit is located on the static electricity inducing pattern.

5. The battery pack for a vehicle according to claim 4, wherein the wire mounting unit is at a corner region of the BMS circuit board, and the static electricity inducing pattern is formed along an edge region of the BMS circuit board.

6. The battery pack for a vehicle according to claim 4, further comprising a static electricity discharge filter at the BMS circuit board, and
wherein the static electricity inducing pattern includes a first inducing pattern connected to the pack connector and a second inducing pattern connected to the static electricity discharge filter.

7. The battery pack for a vehicle according to claim 3, wherein the end plates include a lower plate disposed at the bottom portion of the cell assembly and an upper plate disposed above the lower plate with the cell assembly being interposed therebetween, and
wherein a long bolt member connected to the upper plate, the cell assembly and the lower plate to assemble the upper plate, the cell assembly and the lower plate into a single body is further provided.

8. The battery pack for a vehicle according to claim 7, wherein the BMS circuit board is mounted to an insulating frame and located at an upper surface of the upper plate.

9. The battery pack for a vehicle according to claim 7, wherein the pack case includes a lower case forming an inner space capable of accommodating the end plates and the cell assembly and an upper case covering a top portion of the lower case, and the connector mounting hole is provided at the upper case.

10. The battery pack for a vehicle according to claim 9, wherein the long bolt member passes through a bolt-coupling hole vertically formed in the upper case and assembles the upper case, the upper plate, the cell assembly and the lower plate into a single body.

11. The battery pack for a vehicle according to claim 1, wherein the data transmission terminal and the discharge terminal are selected from a plurality of pins regularly arranged on the BMS circuit board at regular intervals, and
wherein the pack connector is provided in a single number, and the first connection portion and the second connection portion are provided as conductors which individually come into contact with the pins.

12. A vehicle, comprising:
a battery pack for a vehicle, defined in claim 1; and
a ground line electrically connecting the vehicle connector to a vehicle body.

* * * * *